(12) United States Patent
Erbrich

(10) Patent No.: US 10,876,836 B2
(45) Date of Patent: Dec. 29, 2020

(54) TAPE-SUSPENDED FULLY MECHANICAL MERIDIAN GYROSCOPE

(71) Applicant: Klaus Erbrich, Frankfurt (DE)

(72) Inventor: Klaus Erbrich, Frankfurt (DE)

( * ) Notice: Subject to any disclaimer, the term of this patent is extended or adjusted under 35 U.S.C. 154(b) by 232 days.

(21) Appl. No.: 16/078,186

(22) PCT Filed: Feb. 22, 2016

(86) PCT No.: PCT/DE2016/100078
§ 371 (c)(1),
(2) Date: Aug. 21, 2018

(87) PCT Pub. No.: WO2017/144032
PCT Pub. Date: Aug. 31, 2017

(65) Prior Publication Data
US 2019/0041210 A1    Feb. 7, 2019

(51) Int. Cl.
*G01C 19/38*   (2006.01)
*G01C 19/16*   (2006.01)

(52) U.S. Cl.
CPC ............. *G01C 19/38* (2013.01); *G01C 19/16* (2013.01)

(58) Field of Classification Search
CPC ................................ G01C 19/38; G01C 19/34
USPC ........................................ 33/324, 326, 327
See application file for complete search history.

(56) References Cited

U.S. PATENT DOCUMENTS

| 3,172,213 | A | * | 3/1965 | Eklund | G01C 19/38 33/327 |
| 4,379,365 | A | * | 4/1983 | Riethmuller | G01C 19/38 33/316 |
| 4,503,718 | A | * | 3/1985 | Quermann | G01C 19/38 74/5.46 |
| 4,838,099 | A | * | 6/1989 | Quermann | G01C 19/16 74/5.47 |
| 5,349,757 | A | * | 9/1994 | Renker | F16F 15/02 33/316 |
| 5,566,461 | A | * | 10/1996 | Wick | G01C 19/38 33/324 |

FOREIGN PATENT DOCUMENTS

| DE | 1284549 B | * | 12/1968 | ........... C09D 135/06 |
| DE | 1284639 B | * | 12/1968 | |

(Continued)

*Primary Examiner* — Christopher W Fulton
(74) *Attorney, Agent, or Firm* — McAfee & Taft

(57) ABSTRACT

The tape-suspended fully mechanical meridian gyroscope makes it possible to achieve the objective of north-seeking significantly more economically than before. The gyroscope is started up to the necessary rotational speed at the gyroscope cap thereof by an external force source in order to then rotationally move towards north, while suspended on the supporting tape, as a coast-down gyroscope. In order to stop a persisting rotation that goes beyond north, a damping means intervenes until a standstill is reached at north. In order to reliably achieve this, a system that can be finely adjusted with respect to the friction forces is used as the damping means. The north-seeking system according to the invention should be used especially in tunnel construction and in road construction, in azimuth finding, in mountainous terrain, and in many special technical tasks. Failures having electrical or electronic causes do not occur.

20 Claims, 3 Drawing Sheets

(56) References Cited

FOREIGN PATENT DOCUMENTS

Figure 1:
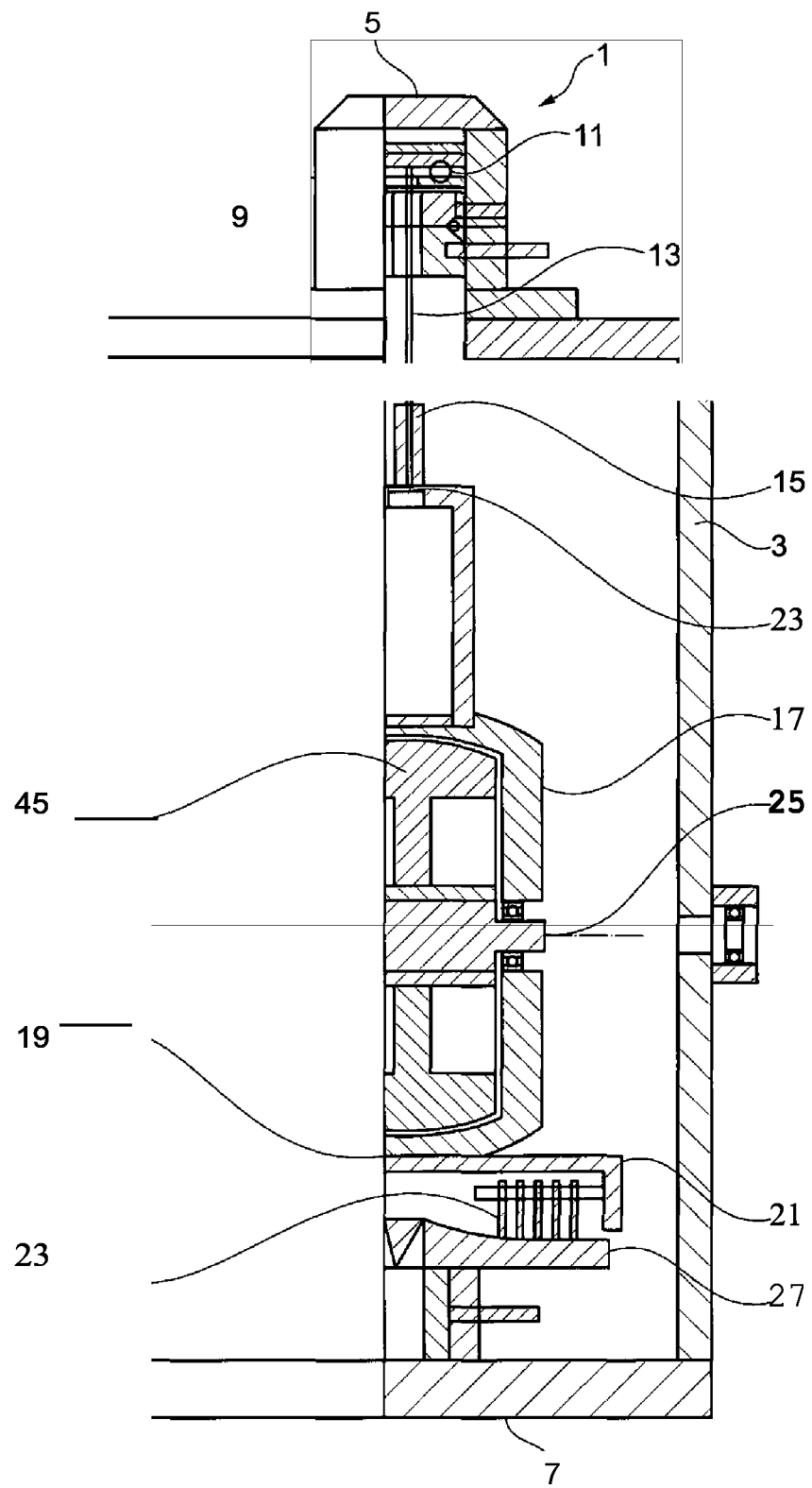

| DE | 1548465 | A1 | * | 8/1969 | ............. | G01C 19/38 |
| DE | 2007736 | A1 | * | 7/1971 | ............. | F01D 5/147 |
| DE | 1798049 | A1 | * | 11/1971 | ............. | H03M 1/00 |
| DE | 2734319 | A1 | * | 2/1979 | ............. | G01C 19/38 |

* cited by examiner

TAPE-SUSPENDED FULLY MECHANICAL MERIDIAN GYROSCOPE

This invention concerns a fully mechanical meridian gyroscope suspended on a tape.

The purpose of this gyroscope is to determine azimuth as a navigation instrument. Thanks to the tape suspension of the gyroscope body, the gyroscope body is bound to the earth solder. This solder binding ties the gyroscope to the earth and thus to the rotation of the earth's body. The gyroscope is arranged in such a way that its axis of twist is horizontal and the gyroscope straightening torque is influenced by the rotation of the earth's body. According to Foucault's theorem of "parallelism of the same direction", the spinning top experiences a disturbance until the swirl axis has moved towards the earth's axis. It is heading north.

Since the gyroscope with its upper cap has a balancing moment resulting from the rotational movement, it will move its swirl axis out of the upper north and thus not allow a clear north display. In order for the gyroscope body and its swirl axis to come to rest when climbing up, down and oscillating, a damping construction is required.

According to the state of the art, a large number of designs of tape-hung meridian rotors are already known. As an example, DE 1 284 549 A, DE 17 98 049 B2, DE 20 07 736A, DE 40 23 349A1 and DE 27 34 319A1. These have different damping systems such as gas or fluid, magnetic and electrostatic and also mechanical damping systems.

The next state of the art is assumed to be DE 1 284 639 A.

A disadvantage of the state of the art is that these are not completely autonomous systems, requiring complex mechanical and/or evaluation electronics that are susceptible to faults and need to be improved in the time it takes to find the north and in its precision.

The task of the present invention is now to supply a meridian gyroscope which allows a fast north-finding with high precision and without supporting electronics and in particular works fully mechanically and which is unaffected by magnetic and/or electrical disturbances.

This is solved by a tape-hung, fully mechanical meridian gyroscope with a gyroscope housing having an upper end and a lower end opposite each other, the gyroscope housing comprising of a hollow cylindrical section in the region of its upper end, in which at least one axial deep groove ball bearing is arranged. The meridian gyroscope further comprising of a supporting strip which is guided or can be guided centrally through the shafts of the ball bearing and a rotor cap arranged directly or indirectly below the first hollow cylindrical portion being fixed and at the lower end or in the region of the lower end of the gyroscope cap a holding device is operatively connected to the gyroscope cap, firmly connected thereto and at least one pendulum body which is displaceable vertically to the gyroscope cap and rotatably mounted in a horizontal plane relative to the gyroscope cap is comprised of the holding device.

The fully mechanical meridian gyroscope according to its design receives a unique energy shock, which is strong enough to allow a sufficiently large straightening torque. The following oscillations of the north search run are then mechanically brought to north upon which an analogue reading from north can be made, i.e. the meridian gyroscope enables the classical Theodolite reading.

Thanks to the fully mechanical meridian gyroscope it is also possible to read out 20° or less from the north with a degree of high precision, without any electrical or electronic failures.

The complete elimination of ever more complex drives and sensors as well as the necessary computing power in the ingenious gyroscope considerably reduces manufacturing costs. At the same time, possible disturbances (power supply, electronic disturbances of all kinds, as well as magnetic field disturbances) become impossible, since the gyroscope can be made of materials which are not affected by magnetic field disturbances. The entire gyroscope can be a magnetic system according to a preferred design form.

North and azimuth finding and therefore complete autonomy in this area (GPS independence) are made possible by means of the meridian gyroscope.

The design allows n, n, with n=1, 2, 3, 4, 5, 6, 7, 8, 9, 10, or more, pendulum bodies for use arranged on a number of m, where m=1, 2, 3, 4, 5, 6, 7, 8, 9, 10 or more, concentric circles with different radii are formed around a circle centre formed by the portable. A concentric circle means in this case only a spatial orientation and not a presence of gyroscopes as such. The pendulum bodies can be arranged offset at an angle around the circle centre of the m concentric circles.

In particular, the pendulum bodies of each of the m concentric circles may be arranged at the same angle or angles with respect to circle centre in order to form a symmetrical arrangement. In particular, 2, 4 or 8 pendulum bodies may be arranged on each of the m concentric circles. The design is such that it may also be preferred that the pendulum bodies are arranged on each of the m concentric circles at a respective angle of 360/n to the next n pendulum bodies.

To find the north, the rotor arranged in the rotor housing is now set in rotation and brought up to a high speed. The gyroscope forms an outlet gyroscope, whose running time in the de-vacuumed state can amount to more than one hour and which begins to move northwards. In order to stop rotation beyond north, the inventive pendulum bodies are used, which can be brought at least temporarily into active connection with another element to further dampen movement of the gyroscope.

The ingenious pendulum bodies, in particular their arrangement and number, as well as their distance to other elements, make it possible to adjust the damping of the gyroscope body and thus shorten the time required to find the north.

The gyroscope does not require any electrical energy for finding north, but the measured value can be read out, for example as with a Theodolite, with the aid of a reading telescope and a glass scale. The expert is familiar with a multitude of reading procedures and devices, also in particular a multitude of optical procedures which do not require any electronic aids.

In accordance with the design of this invention, it may be advantageous that a gyroscopic mast is arranged between the gyroscopic cap and the supporting tape, which is firmly connected to the supporting tape and to the gyroscopic cap, in particular by means of a lower first tape clamp and the supporting tape is directly or indirectly firmly connected to the axial deep groove ball bearing to an upper bearing shell of the axial deep groove ball bearing by means of an upper second tape clamp.

It is obvious for a specialist that a firm connection of the carrying strap and the rotary mast or the carrying strap with the ball bearing with various fastening means and procedures is possible. In addition to the preferred tape clamp, these can also be joined using an adhesive, welded, etc. It may be preferable for the gyroscope cap to form a hollow body, the gyroscope cap being particularly gas-tight and preferably being evacuated by means of a gas-tight recess and/or being filled, partially, by means of a filling material.

Such an evacuation of the hollow body can improve the rotation of the gyroscope. Partial filling of the gyroscope cap leads to a smaller remaining volume inside, which can be evacuated faster and easier.

It is also possible that a drive device is included which can or is operatively connected by means of a drive shaft with a force transmission area enclosed by the gyroscope cap, the drive device being designed and arranged to rotate the gyroscope.

It may be advantageous to have a plate-shaped device which is arranged below the at least one pendulum body, in particular a friction plate, whereby the plate-shaped device is or can be brought into operative connection with the at least one pendulum body temporarily, so that a rotation and/or an oscillation of the gyroscope cap can be damped or is being damped.

It may be advantageous that the distance between the plate-shaped device and the lower end of the gyroscope cap can be varied by means of a first distance changing device.

By an inventive plate-shaped device a stemming of the rotation and/or an oscillation of the gyroscope cap can take place. It is precisely this damping that is of decisive importance, as it can be used to determine the sensitivity of the northing process. The setting of the attenuation therefore results in a change of the search time as well as the search accuracy.

A very fine adjustment of the desired damping effect can be achieved by selecting the number and arrangement of the pendulum bodies by means of the pendulum bodies which are operatively connected to the plate-shaped device. With an oscillation of the gyroscope cap, the effect also occurs that not all pendulum bodies are effectively connected to the plate-shaped device, but, depending on the amplitude of the oscillation, also a subset of it. The number of pendulum bodies in operative connection as a function of the deflection of oscillation can also be defined by the design of the geometry for the plate-shaped device.

Another way to adjust the damping is to adjust the distance of the plate-shaped device from the lower end of the gyroscope cap. The smaller the distance, the greater the damping.

It is possible to determine the friction between the pendulum bodies and the plate-shaped device through several parameters, such as the number and arrangement of the pendulum bodies, the geometry of the plate-shaped device and its distance from the gyroscope cap and the desired damping.

The distance of the ball bearing from the upper end of the gyroscope housing is variable, in particular by means of a second distance changing device.

Such a change of distance for the gyroscope cap from the upper end of the gyroscope housing leads to oscillation free gyroscope cap in the housing, in which the invented meridian gyroscope is untouchable from a rest position, for example the pendulum bodies rest on the plate-shaped device, into an operating position or is transferred.

Here it is advantageous if no impulses are transmitted to the gyroscope through unlocking, which delay a north-finding of which must be compensated first. The locked rotor itself is first brought to the required speed and decoupled from the external power source. Now the rotor is lifted by means of the second distance changing device and unlocked by lifting without disturbance by the external drive.

It can therefore be particularly advantageous for at least one first and/or at least one second distance changing device is designed and set up to enable a distance change free of jolts and without conical effect.

It may also be advantageous that the at least one second distance changing device comprises a first guide pin on which the ball bearing rests directly and/or indirectly, the first guide pin extending in a first sloping recess whose first end is further away from the upper end of the gyroscope housing than an opposite second end of the recess, whereby in particular the axial deep groove ball bearing comprises of a vertically arranged recess in the form of a vertical groove into which a projection formed by the gyroscope housing or provided in the gyroscope housing engages to prevent a rotational movement of the ball bearing.

It may also be preferable that the at least one first distance changing device comprises of a second guide pin on which the plate-shaped device rests directly and/or indirectly, the second guide pin extending in a sloping recess, the first end of which is further away from the lower end of the gyroscope housing than the opposite second end of the recess.

It is apparent that such a design incorporated in the distance changing devices allows a shock-free change of the distance without any conical effect.

The invention also provides the use of an ingenious meridian gyroscope for finding the north in tunnel and road construction, mining, aeroplanes and in the aerospace industry, missiles and/or in the automotive sector.

Further features and advantages of the invention result from the following description, in which examples are explained by means of schematic drawings without thereby limiting the invention.

Showing

Figure 2:
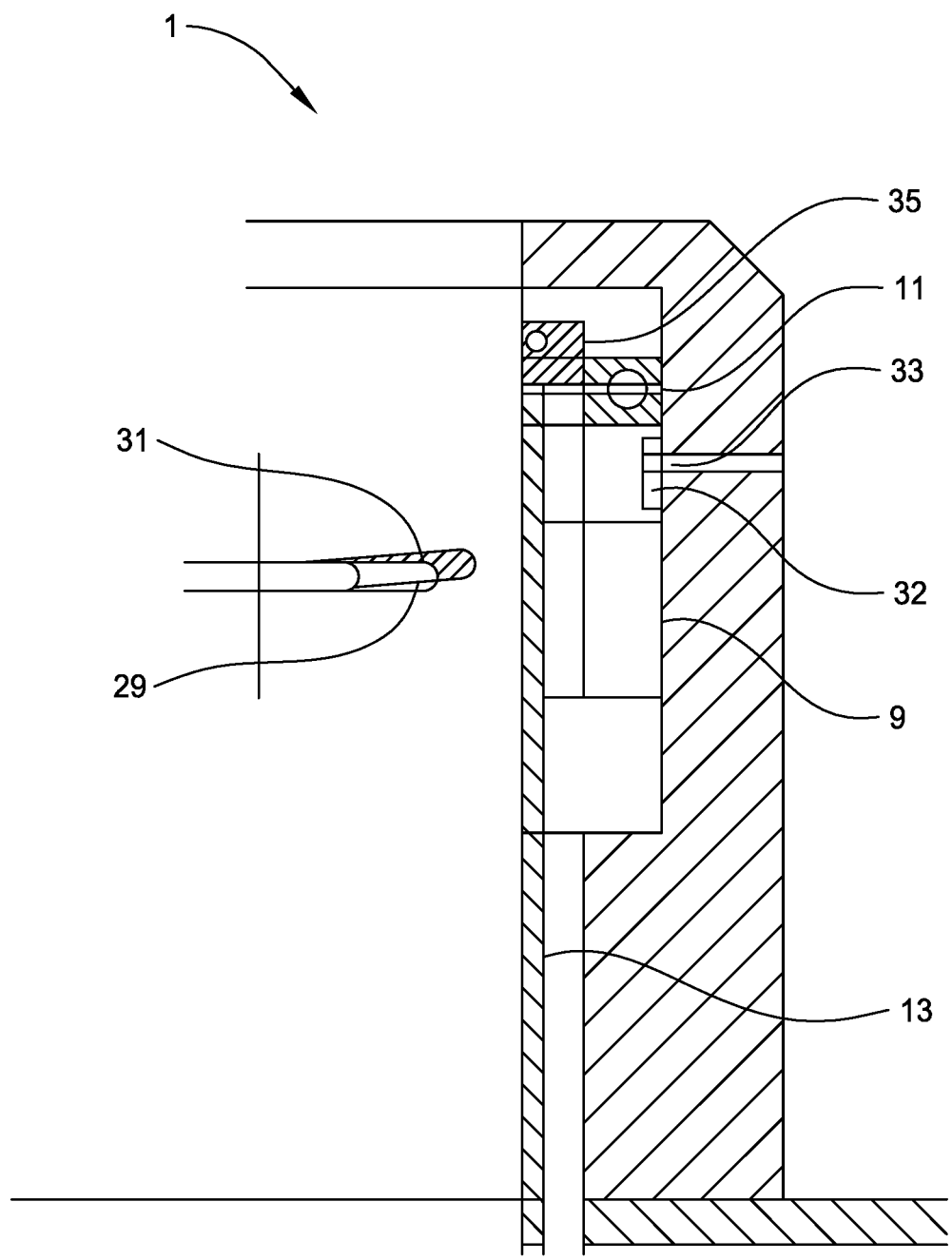
Figure 3:
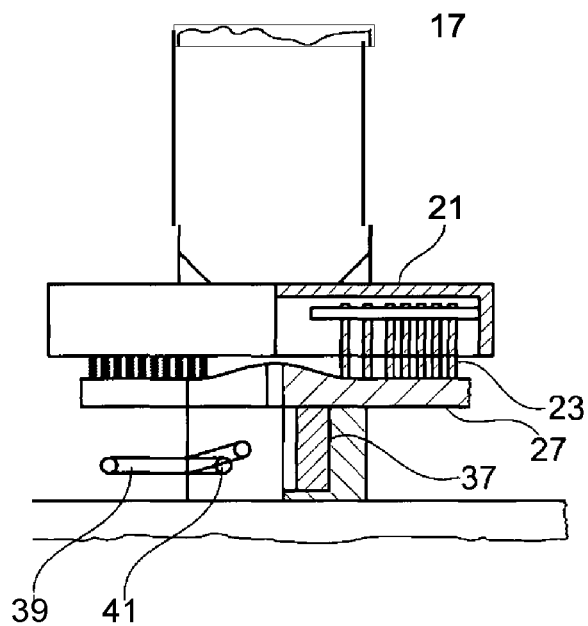
Figure 4:
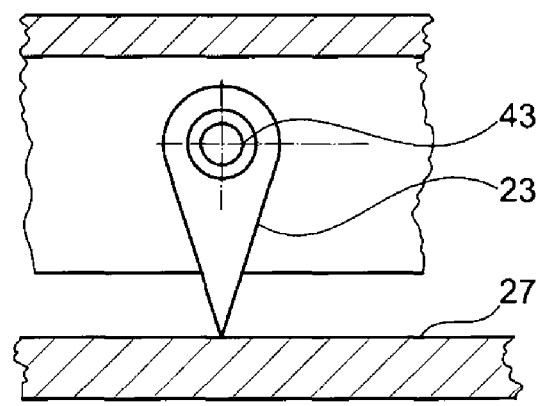

FIG. 1: a schematic (partial) sectional view of an inventive meridian gyroscope;

FIG. 2: a schematic (partial) sectional view of an upper part of Meridian gyroscope according to the design;

FIG. 3: a schematic (partial) sectional view of a damping range of an ingenious meridian gyroscope; and FIG. 4: a schematic sectional view of the meridian gyroscope damping range according to the design.

The drawings show an example of a fully mechanical meridian gyroscope 1 with a gyroscope housing 3, which has an upper end 5 and a lower end 7 opposite the upper end 5.

The gyroscope housing 3 comprises of a hollow cylindrical section 9 in the area of its upper end 5 and a ball bearing 11, shown in the form of an axial deep groove ball bearing arranged in the hollow cylindrical section 9. The meridian gyroscope 1 also comprises a carrying strap 13 which is guided centrally through the shafts of the ball bearing 11 and is directly connected to it as well as to a gyroscope cap 17 arranged below the first hollow cylindrical section 9.

Between the gyroscope cap 17 and the carrying strap 13 there is a gyroscope mast 15, which is firmly connected to the carrying strap 13 and to the gyroscope cap 17 by means of a lower first strap clamp 23. The carrying strap 13 is connected to the ball bearing 11 with an upper second strap clamp 35.

At the lower end 19 of the gyroscope cap 17 is arranged one with the gyroscope cap 17 fixed to this holding device 21, which comprises of several pendulum bodies 23, which are displaceable vertically to the gyroscope cap 17 and rotatable mounted in a horizontal plane relative to the gyroscope cap 17.

The shown gyroscope cap 17 forms a hollow body in which the gyroscope 45 is arranged, whereby the gyroscope cap 17 is designed fluid-tight and can be evacuated by means of a recess. The gyroscope cap 17 cannot be filled with a filling material.

A drive device (not shown) may be operatively connected by means of a drive shaft having a force transmission range 25 covered by the gyroscope cap 17 to set the gyroscope 45 arranged in the gyroscope cap 17 in rotation.

A plate-shaped device 27 is arranged below the pendulum body 23 and acts as a friction plate so that a rotation and/or an oscillation of the gyroscope cap 17 is dampened by an active connection between the pendulum body 23 and friction plate 27.

The distance of the plate-shaped device 27 is variable with respect to the lower end 19 of the gyroscope cap 17, in particular by means of the first distance changing device as shown.

The first distance changing device, clearly shown in FIG. 3, comprises of a second guide pin 39 on which the plate-shaped device 27 rests directly. The second guide pin 39 is located in a second sloping recess 41, the first end of which is further away from the lower end 7 of the gyroscope housing 3 than the opposite second end of the recess 41.

The distance of the ball bearing 11 from the upper end 5 of the gyroscope housing 3 can also be varied by means of a second distance changing device. This second distance changing device is clearly visible in FIG. 2. The second distance changing device comprises of a first guide pin 29 on which the ball bearing 11 rests directly. The first guide pin 29 runs, as shown, in a first sloping recess 31, whose first end is further away from the upper end 5 of the gyroscope housing 3 than the opposite second end of the recess.

The ball bearing 11 comprises of a vertically arranged recess 32, into which a projection 33 provided by the gyroscope housing 3 engages to prevent a rotary movement of the ball bearing 11.

The first and second distance changing devices are designed and set up in accordance with the design example shown in order to allow a distance change free of jolts and without grain size.

The features disclosed in the foregoing description, its claims and drawings may be essential for the realization of the design in its various forms, either individually or in any combination.

The invention claimed is:

1. A fully mechanical meridian gyroscope suspended on a belt, comprising of a gyroscope housing having an upper end and a lower end opposite the upper end, the gyroscope housing comprising in the region of its upper end a hollow cylindrical portion in which at least one axial deep groove ball bearing is arranged, the meridian gyroscope further comprising of a carrier tape which is guided or can be guided centrally through the shafts of the ball bearing and is connected to a gyroscope cap arranged below the first hollow cylindrical portion directly or indirectly at the lower end or in the region of the lower end of the gyroscope cap correlative with the gyroscope cap and a holding device connected with the gyroscope cap, said holding device being covered by at least one pendulum body which is vertically movable to the gyroscope cap and rotatable mounted in a horizontal plane relative to the gyroscope cap.

2. The fully mechanical meridian gyroscope according to claim 1, further comprising a gyroscope mast is arranged between the gyroscope cap and the support tape, wherein said gyroscope mast is firmly connected by a lower first tape clamp to the support tape and in turn to the gyroscope cap and the support tape, this is directly or indirectly firmly connected with an upper second tape clamp, to the axial deep groove ball bearing with an upper bearing shell in the axial groove ball bearing.

3. The fully mechanical meridian gyroscope of claim 2, further comprising a plate-shaped device which is arranged below the pendulum body and a friction plate, whereby the plate-shaped device is configured to be brought into operative connection with at least one pendulum body temporarily, so that a rotation and/or an oscillation of the gyroscope cap can be dampened.

4. The fully mechanical meridian gyroscope of claim 3, wherein a distance of the plate-shaped device is variable with respect to the lower end of the gyroscope cap, wherein the distance is changed by a first distance changing device.

5. The fully mechanical meridian gyroscope of claim 4, wherein a distance of the ball bearing is variable from the upper end of the gyroscope housing, wherein the distance is changed by a second distance changing device.

6. The fully mechanical meridian gyroscope of claim 5, wherein the first distance changing device and/or the second distance changing device enable the changing of the distance, respectively, to occur freely and without conical effect.

7. The fully mechanical meridian gyroscope of claim 6, wherein the second distance changing device includes a guide pin on which the ball bearing rests directly and/or indirectly, the guide pin extends in a sloping recess, the first end of which is further spaced from the upper end of the gyroscope housing and then again at the opposite second end of the recess, the ball bearing comprising a vertically arranged recess in the form of a vertical groove into which a projection formed by the gyroscope housing or provided in the gyroscope housing engages to prevent rotational movement of the ball bearing.

8. The fully mechanical meridian gyroscope of claim 4, wherein the first distance changing device includes a guide pin on which the plate-shaped device rests directly and/or indirectly and the guide pin extends in a sloping recess, the first end of which is further spaced from the lower end of the gyroscope housing than the opposite end of the recess.

9. The fully mechanical meridian gyroscope of claim 2, wherein the fully mechanical meridian gyroscope is made of non-magnetic materials.

10. The fully mechanical meridian gyroscope of claim 1, wherein the gyroscope cap forms a hollow body, wherein the gyroscope cap is gas-tight and can be evacuated by a gas-tight sealable recess and/or is filled partially with a filling material.

11. The fully mechanical meridian gyroscope of claim 1, further comprising a drive which can be operatively connected by a drive shaft having a force transmission region enclosed by the gyroscope cap and the drive direction is being adapted and arranged to rotate the gyroscope set in the gyroscope cap.

12. The fully mechanical meridian gyroscope of claim 1, further comprising a plate-shaped device which is arranged below the pendulum body and a friction plate, whereby the plate-shaped device is configured to be brought into operative connection with at least one pendulum body temporarily, so that a rotation and/or an oscillation of the gyroscope cap can be dampened.

13. The fully mechanical meridian gyroscope of claim 12, wherein a distance of the plate-shaped device is variable with respect to the lower end of the gyroscope cap, wherein the distance is changed by a first distance changing device.

14. The fully mechanical meridian gyroscope of claim 13, wherein a distance of the ball bearing is variable from the upper end of the gyroscope housing, wherein the distance is changed by a second distance changing device.

15. The fully mechanical meridian gyroscope of claim 14, wherein the first distance changing device and/or the second distance changing device enable the changing of the distance, respectively, to occur freely and without conical effect.

16. The fully mechanical meridian gyroscope of claim 15, wherein the second distance changing device includes a guide pin on which the ball bearing rests directly and/or indirectly, the guide pin extends in a sloping recess, the first end of which is further spaced from the upper end of the gyroscope housing and then again at the opposite second end of the recess, the ball bearing comprising a vertically arranged recess in the form of a vertical groove into which a projection formed by the gyroscope housing or provided in the gyroscope housing engages to prevent rotational movement of the ball bearing.

17. The fully mechanical meridian gyroscope of claim 16, wherein the first distance changing device includes a guide pin on which the plate-shaped device rests directly and/or indirectly and the guide pin extends in a sloping recess, the first end of which is further spaced from the lower end of the gyroscope housing than the opposite end of the recess.

18. The fully mechanical meridian gyroscope of claim 13, wherein the first distance changing device includes a guide pin on which the plate-shaped device rests directly and/or indirectly and the guide pin extends in a sloping recess, the first end of which is further spaced from the lower end of the gyroscope housing than the opposite end of the recess.

19. The fully mechanical meridian gyroscope of claim 1, wherein the fully mechanical meridian gyroscope is made of non-magnetic materials.

20. The fully mechanical meridian gyroscope of claim 1, wherein the fully mechanical meridian gyroscope is suitable for use for finding the north in tunnel or road constructions, mining, aircraft, missiles and/or in the automotive sector.

\* \* \* \* \*